US012757282B2

(12) United States Patent
Martin et al.

(10) Patent No.: US 12,757,282 B2
(45) Date of Patent: Oct. 6, 2026

(54) EDT COMPLETION ENHANCEMENT ASSOCIATED WITH IoT-NTN

(71) Applicant: InterDigital Patent Holdings, Inc., Wilmington, DE (US)

(72) Inventors: Brian Martin, Farnham (GB); Dylan Watts, Montreal (CA); Moon-il Lee, Melville, NY (US); Paul Marinier, Brossard (CA); Faris Alfarhan, Montreal (CA); Oumer Teyeb, Montreal (CA); Umer Salim, Vallauris (FR); Keiichi Kubota, Tokyo (JP)

(73) Assignee: InterDigital Patent Holdings, Inc., Wilmington, DE (US)

( * ) Notice: Subject to any disclaimer, the term of this patent is extended or adjusted under 35 U.S.C. 154(b) by 326 days.

(21) Appl. No.: 18/655,602

(22) Filed: May 6, 2024

(65) Prior Publication Data

US 2025/0344276 A1 Nov. 6, 2025

(51) Int. Cl.

| | |
|---|---|
| ***H04W 74/08*** | (2024.01) |
| ***H04L 5/00*** | (2006.01) |
| ***H04W 24/08*** | (2009.01) |
| ***H04W 68/02*** | (2009.01) |
| ***H04W 76/20*** | (2018.01) |

(52) U.S. Cl.

CPC ........... *H04W 76/20* (2018.02); *H04L 5/0053* (2013.01); *H04W 24/08* (2013.01); *H04W 68/02* (2013.01)

(58) Field of Classification Search

None

See application file for complete search history.

(56) References Cited

U.S. PATENT DOCUMENTS

2020/0196264 A1* 6/2020 Shih .................. H04W 56/0045
2020/0383085 A1* 12/2020 Shih .................... H04W 56/005

(Continued)

OTHER PUBLICATIONS

3rd Generation Partnership Project (3GPP), RP-240776, "Revised WID on Non-Terrestrial Networks (NTN) for Internet of Things (IoT) Phase 3", MediaTek Inc. (Rapporteur), 3GPP TSG RAN Meeting #103, Maastricht, Netherlands, Mar. 18-21, 2024, pp. 1-6.

(Continued)

*Primary Examiner* — Sithu Ko

(74) *Attorney, Agent, or Firm* — Condo Roccia Koptiw LLP

(57) ABSTRACT

A wireless transmit/receive unit (WTRU) may receive an indication of EDT configuration information. The device may determine (e.g., based on application information, for example application layer information) that a first uplink EDT transmission is triggered for first uplink data. The application layer information may indicate an early data complete response is not required for the first uplink EDT transmission. The device may determine, based on the trigger, an EDT completion response mode to apply based on the received indication. The device may send the first uplink EDT transmission (e.g., including first uplink data) to a network to indicate that no response is expected for the first uplink EDT transmission, and a completion response mode. The device may determine that a completion indication from the network has not been detected before a time threshold. The device may, based on the lack of detection, continue operation in accordance with an idle condition and monitor for a paging message.

14 Claims, 13 Drawing Sheets

(56) References Cited

U.S. PATENT DOCUMENTS

| | | | | |
|---|---|---|---|---|
| 2021/0014011 A1* | 1/2021 | Xiong | H04L 1/1887 | |
| 2021/0014864 A1* | 1/2021 | Phuyal | H04W 72/21 | |
| 2021/0259021 A1* | 8/2021 | Huang | H04W 74/0833 | |
| 2022/0022229 A1* | 1/2022 | Wong | H04W 72/20 | |
| 2022/0264617 A1* | 8/2022 | Sha | H04W 72/20 | |
| 2023/0199617 A1* | 6/2023 | Höglund | H04W 48/02 | 370/329 |

OTHER PUBLICATIONS

3rd Generation Partnership Project (3GPP), TS 24.301 V18.6.0, Technical Specification Group Core Network and Terminals, Non-Access Stratum (NAS) protocol for Evolved Packet System (EPS), Stage 3 (Release 18), Mar. 2024, pp. 1-631.

3rd Generation Partnership Project (3GPP), TS 24.501 V18.6.0, "Technical Specification Group Core Network and Terminals, Non-Access-Stratum (NAS) protocol for 5G System (5GS), Stage 3, (Release 18)", Mar. 2024, pp. 1-1218.

3rd Generation Partnership Project (3GPP), TS 36.300 V18.1.0, "Technical Specification Group Radio Access Network, Evolved Universal Terrestrial Radio Access (E-UTRA), and Evolved Universal Terrestrial Radio Access Network (E-UTRAN), Overall description, Stage 2 (Release 18)", Mar. 2023, pp. 1-404.

3rd Generation Partnership Project (3GPP), R2-2402336, "Uplink Capacity Enhancement for EDT transaction", Spreadtrum Communications, 3GPP TSG-RAN WG2 Meeting #125bis Changsha, China, Apr. 15-19, 2024, pp. 1-4.

3rd Generation Partnership Project (3GPP), R2-2409190, "EDT/PUR Enhancements", InterDigital, Inc., 3GPP Ran WG2 Meeting #127bis, Hefei, China, Oct. 14-18, 2024, 8 pages.

* cited by examiner

EDT COMPLETION ENHANCEMENT ASSOCIATED WITH IoT-NTN

BACKGROUND

Mobile communications using wireless communication continue to evolve. A fifth generation may be referred to as 5G. A previous (legacy) generation of mobile communication may be, for example, fourth generation (4G) long term evolution (LTE).

SUMMARY

Systems, methods, and instrumentalities are described herein related to early data transfer (EDT) completion.

An example device may include a processor configured to perform one or more actions. For example, a device (e.g., a wireless transmit/receive unit (WTRU) may (e.g., be configured to) receive an indication that indicates early data transfer (EDT) configuration information. The device may (e.g., be configured to) determine that a first uplink EDT transmission is triggered for first uplink data. The determination that the first uplink EDT transmission is triggered for the first uplink data may be based on application information. The application information may indicate that an early data complete response is not required for the first uplink EDT transmission. The device may (e.g., be configured to) determine, based on the determination that the first uplink EDT transmission is triggered, an EDT completion response mode to apply based on the received indication. The device may (e.g., be configured to) send the first uplink EDT transmission to a network entity. The first uplink EDT transmission may include the first uplink data. The first uplink EDT transmission may indicate: that no response is expected for the first uplink EDT transmission, and a completion response mode. The device may (e.g., be configured to) determine that a completion indication from the network entity has not been detected, e.g., before a time threshold. The device may (e.g., be configured to), based on the determination that the completion indication from the network entity has not been detected, continue operation in accordance with an idle condition and monitor for a paging message.

the device (e.g., processor) may (e.g., be configured to) determine that a second uplink EDT transmission is triggered for second uplink data. The device may (e.g., be configured to) send the second uplink EDT transmission to the network entity. The second uplink EDT transmission may include the second uplink data. The device may (e.g., be configured to), based on the determined EDT completion response mode, monitor for the completion indication. The completion indication may be indicated via one of: reception of a common ACK or a lack of NACK reception during a time duration. The device may (e.g., be configured to) detect the completion indication.

The EDT configuration information may indicate first and second EDT configurations. The first EDT configuration may indicate at least one of: a first completion response mode or a first set of one or more conditions. The second EDT configuration may indicate at least one of: a second completion response mode or a second set of one or more conditions.

The determined EDT completion response mode may be one of the first completion response mode or the second completion response mode. The determined EDT completion response mode may be determined based on a corresponding set of one or more conditions being satisfied. The corresponding set of one or more conditions may be one of the first set of one or more conditions or the second set of one or more conditions.

The corresponding set of one or more conditions may comprise one or more of: a data size satisfying a threshold, a timing advance (TA) threshold being satisfied, or a reference signal received power (RSRP) threshold being satisfied.

The indication that indicates the EDT configuration information may be received via system information.

EXAMPLE NETWORKS FOR IMPLEMENTATION OF THE EMBODIMENTS

Figure 1A:
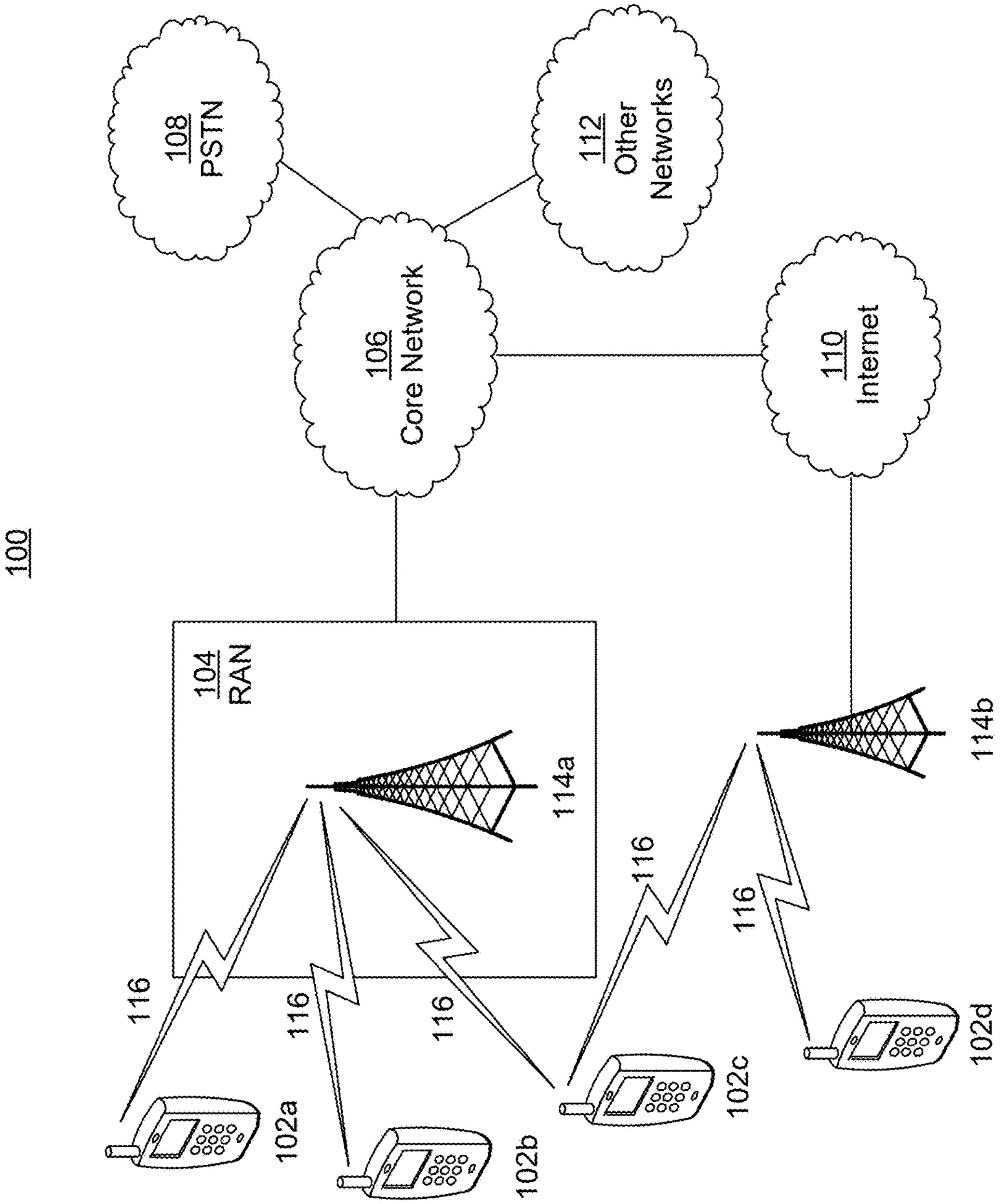
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (loT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106/115, the Internet 110, and/or the other networks 112. By way of example, the base stations 114*a*, 114*b* may be a base transceiver station (BTS), a Node-B, an eNode B, a Home Node B, a Home eNode B, a gNB, a NR NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
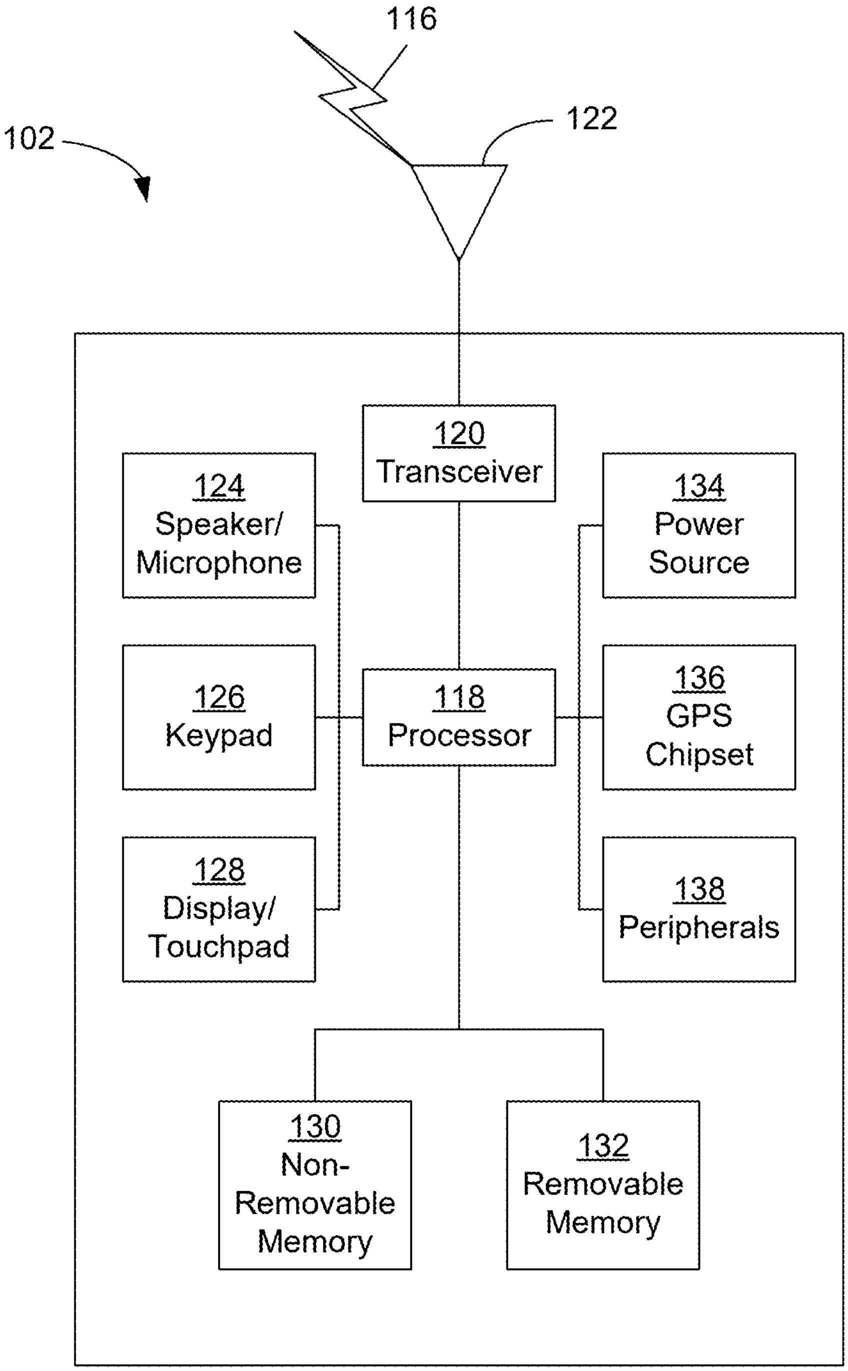
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
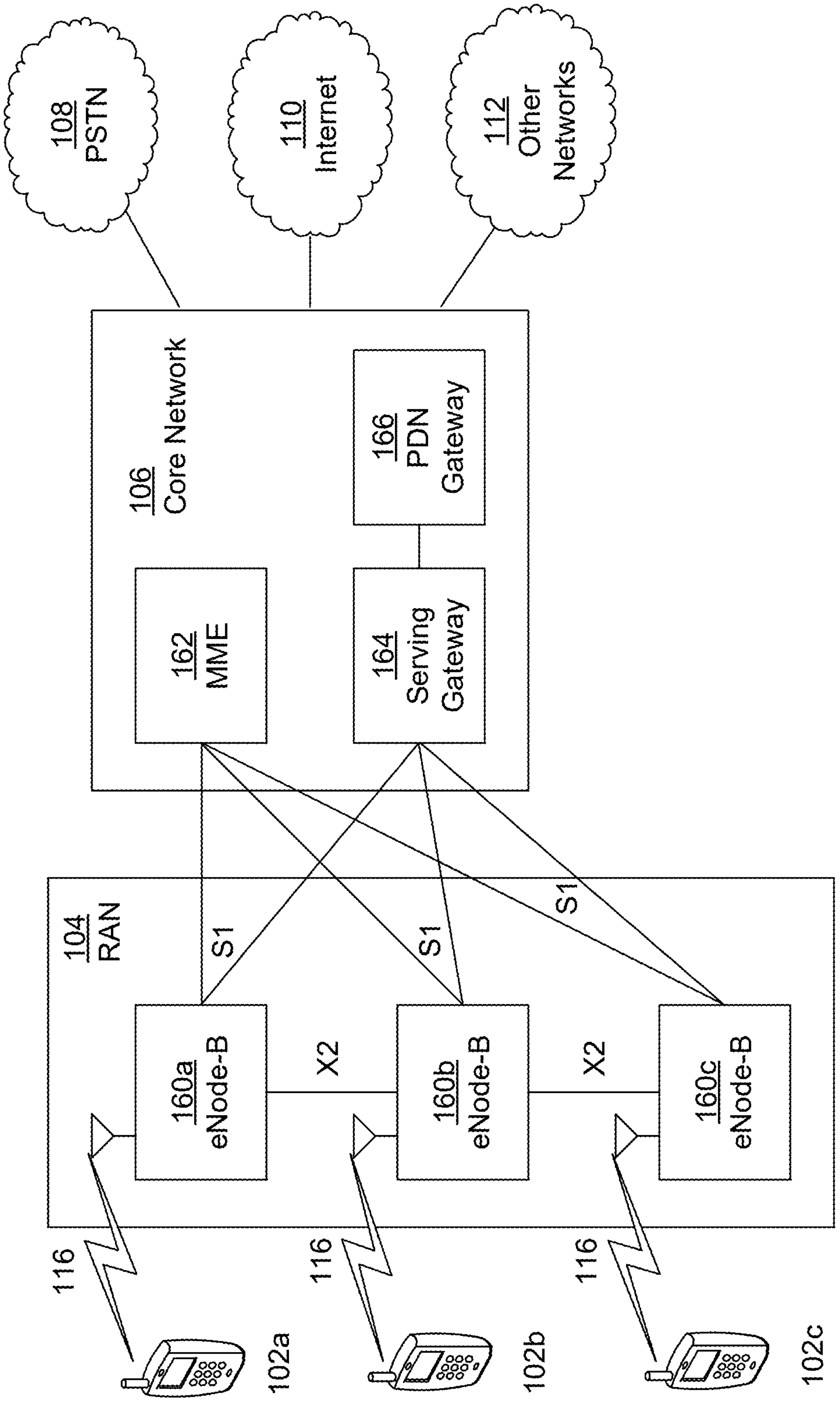
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an “ad-hoc” mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHZ, 2 MHZ, 4 MHZ, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
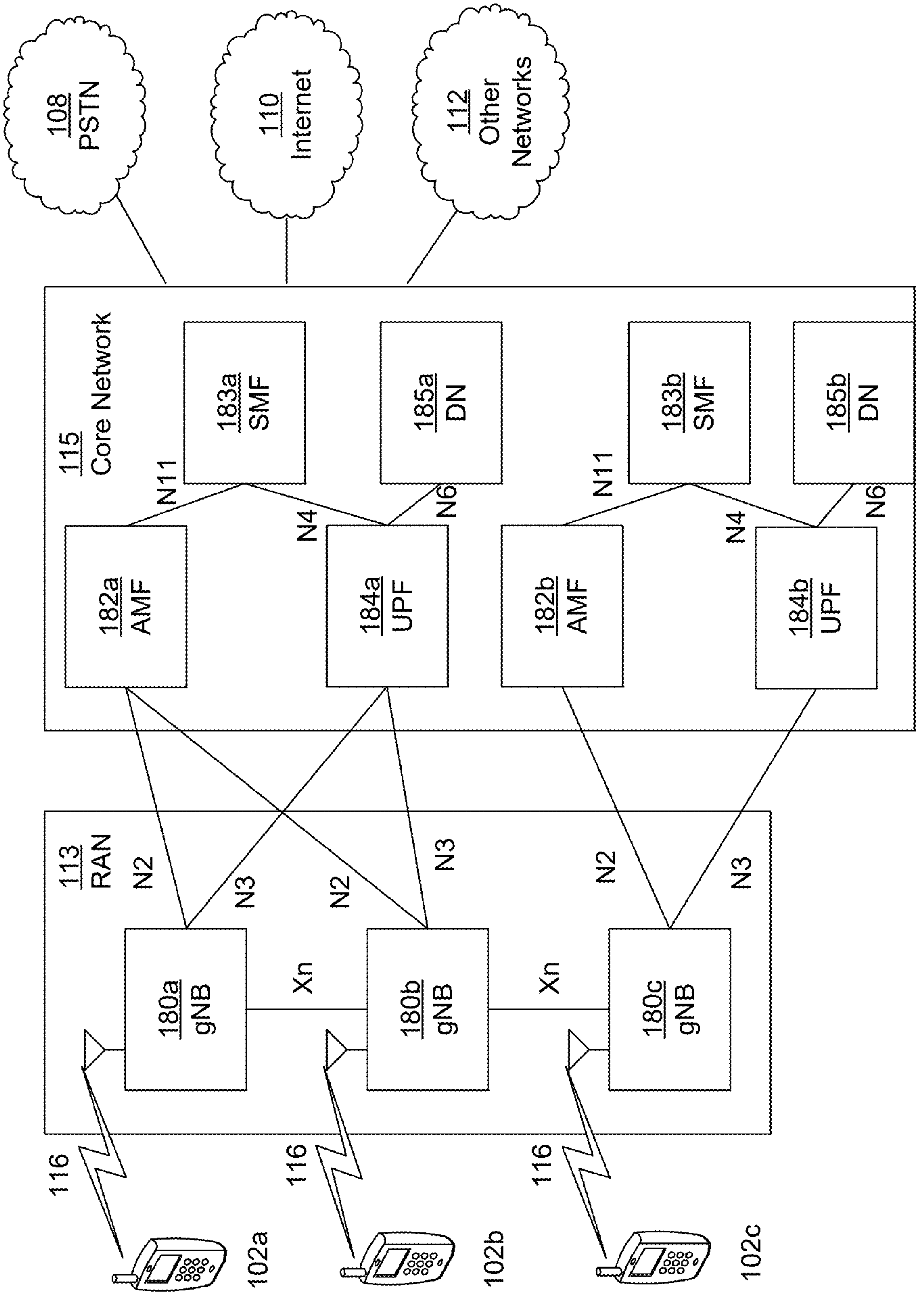
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (COMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Early data transmission (EDT) completion may be enhanced, e.g., for an Internet of things (IoT)-non-terrestrial network (NTN). EDT transmission completion may be determined without reception of an "RRC Early Data Complete" (e.g., in all cases). A wireless transmit/receive unit (WTRU) may determine (e.g., based on criteria and/or characteristics of the uplink transmission) a mode to use if/when performing an EDT (e.g., whether to receive an early data complete message, how to receive an early data complete message, and/or how to determine successful completion of the procedure). A WTRU may perform an EDT transmission and may complete using the selected mode of operation.

Consumer IoT (CIoT) signaling reduction optimization may be implemented. CIoT signaling reduction optimization may be applicable, for example, to narrowband loT (NB-IoT) and/or enhanced machine-type communication (eMTC). In some examples (e.g., in a control plane solution), data may be sent in a non-access stratum (NAS) message transmitted in a radio resource control (RRC) container message (e.g., sent in a control plane RRC message). In some examples (e.g., in a user plane solution), a WTRU may be configured to store the WTRU's access stratum (AS) context, for example, if/when being sent to RRC_IDLE using a "suspend" message. The WTRU may restore the AS context, for example, if/when the connection is resumed and/or data is transmitted and received on a user radio bearer (e.g., user plane).

Figure 2:
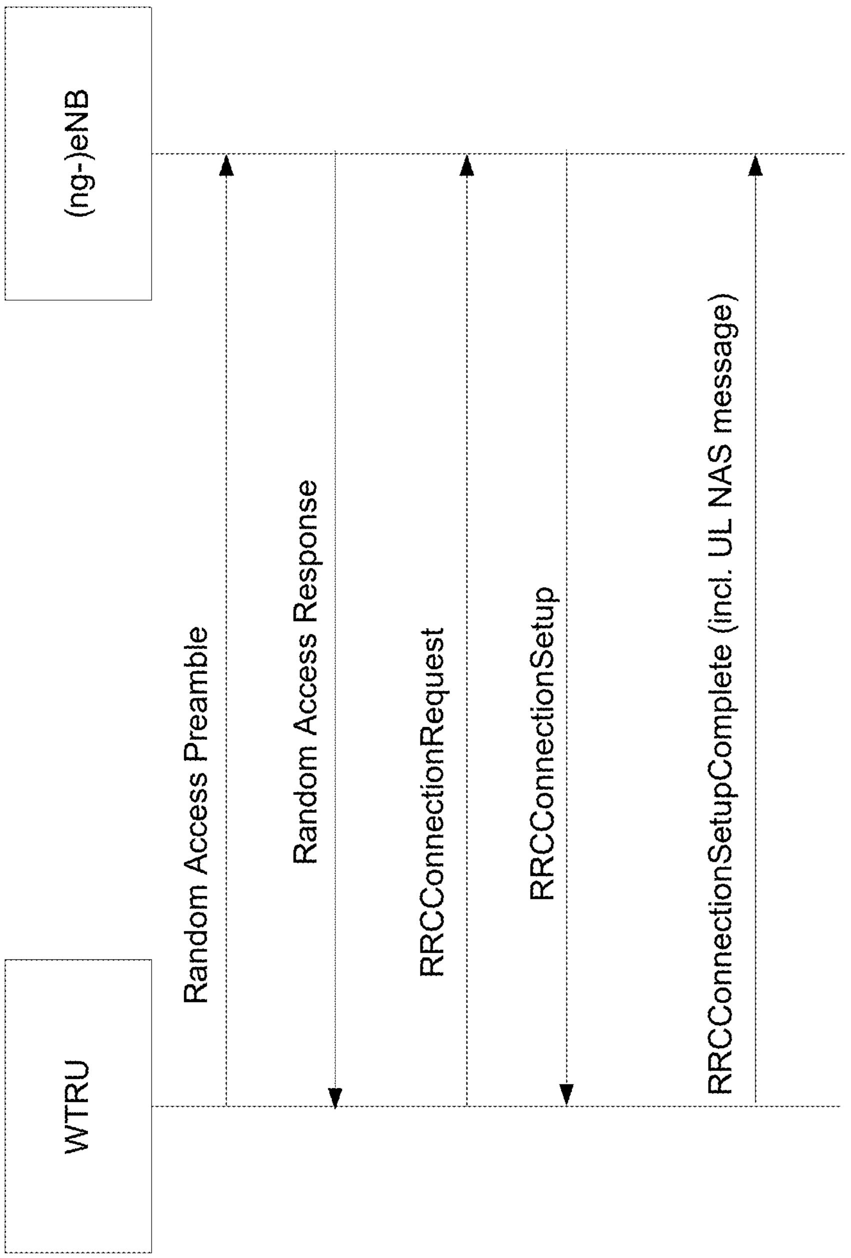
FIG. 2 illustrates an example of an RRC connection established for Control Plane CIoT EPS/5GS optimizations.

An RRC connection established for Control Plane CIoT optimization (e.g., 4G core network (CN) evolved packet system (EPS) optimization) and/or Control Plane CIoT 5GS optimization may be characterized, for example, as shown in FIG. 2.

FIG. 2 illustrates an example of an RRC connection established for Control Plane CIoT EPS/5GS optimizations.

An RRC connection established for User Plane CIoT optimization (e.g., 4G CN EPS optimization) and/or User Plane CIoT 5GS Optimization may be characterized.

Figure 3:
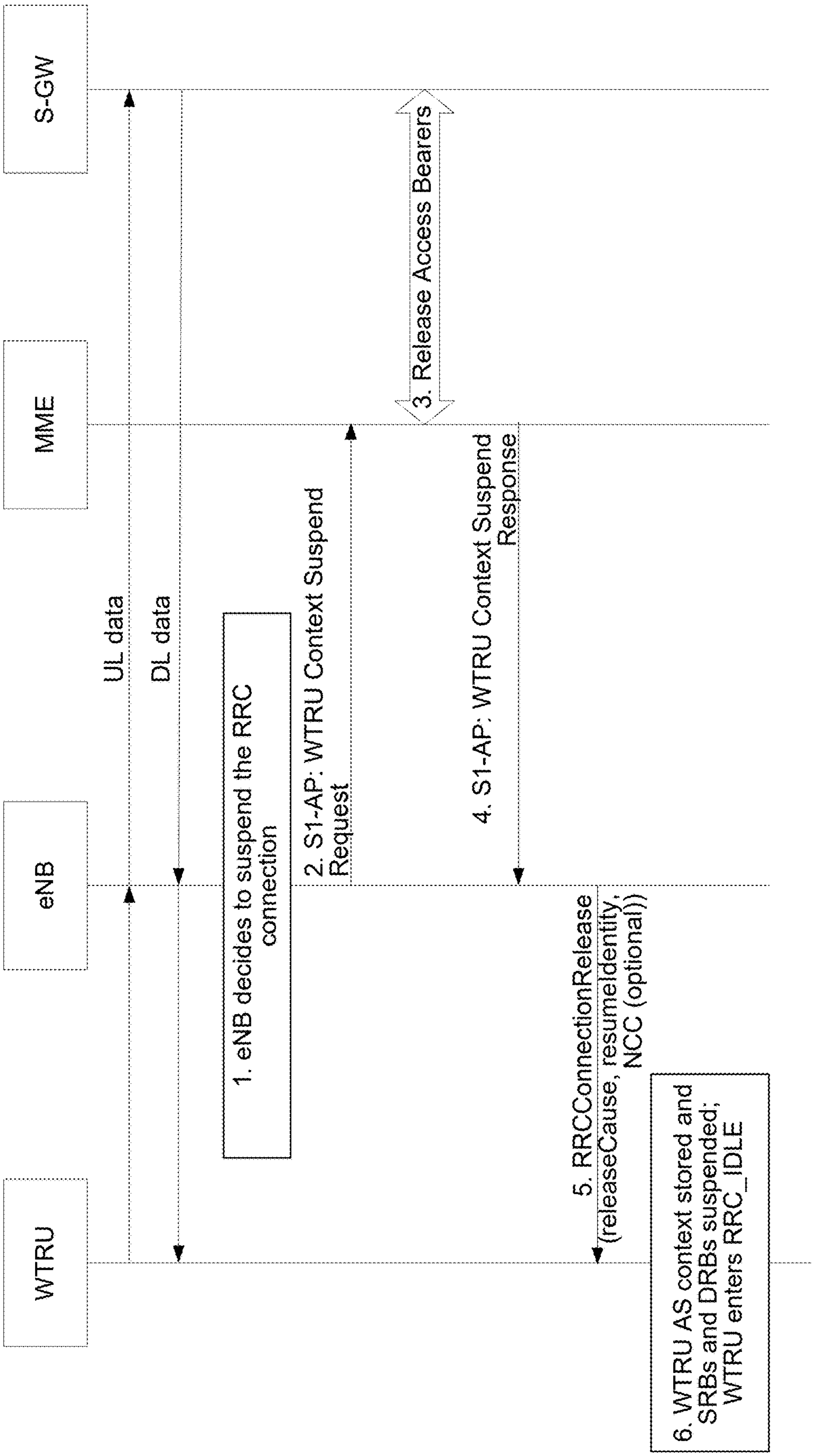
FIG. 3 illustrates an example of an RRC Connection Suspend procedure (e.g., in EPS).

FIG. 3 illustrates an example of an RRC Connection Suspend procedure (e.g., in EPS).

Figure 4:
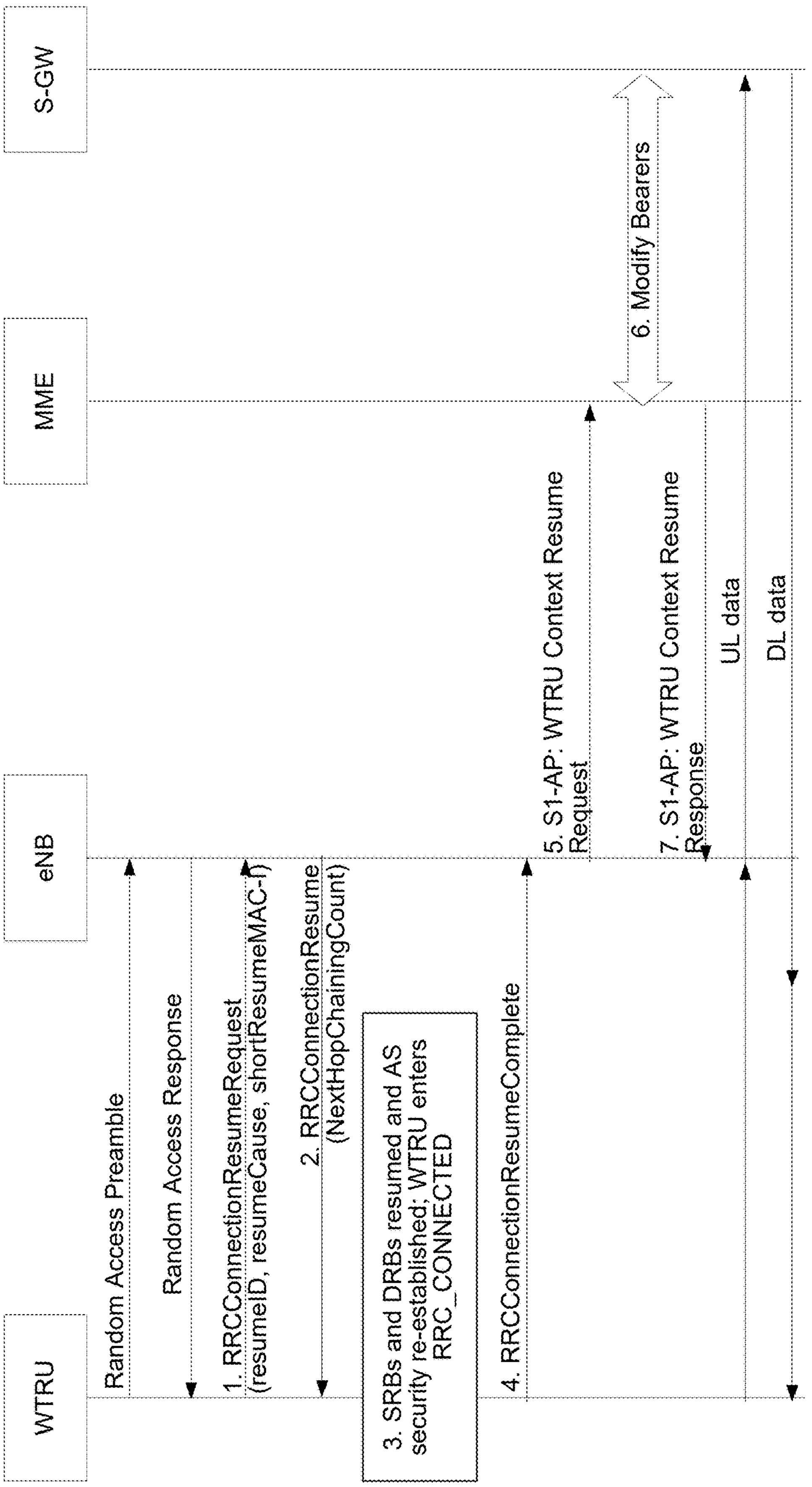
FIG. 4 illustrates an example of an RRC Connection Resume procedure (e.g., in EPS).

FIG. 4 illustrates an example of an RRC Connection Resume procedure (e.g., in EPS).

Early data transmission (EDT) may be mobile originated (MO) and/or mobile terminated (MT).

Mobile originated early data transmission (MO-EDT) may enhance data transmission, for example, using the control plane (CP) and user plane (UP) modes. MO-EDT may allow an (e.g., one) uplink data transmission, which may be (e.g., optionally) followed by a (e.g., one) downlink data transmission, during a random access procedure.

MO-EDT may be triggered, for example, if/when the upper layers have requested the establishment or resumption of the RRC Connection for Mobile Originated data (e.g., not signaling or short message service (SMS) and the uplink data size is less than or equal to a transport block (TB) size indicated in the system information. MO-EDT may not be used for data over the control plane, for example, if/when using the User Plane CIoT EPS/5GS optimizations.

Figure 5:
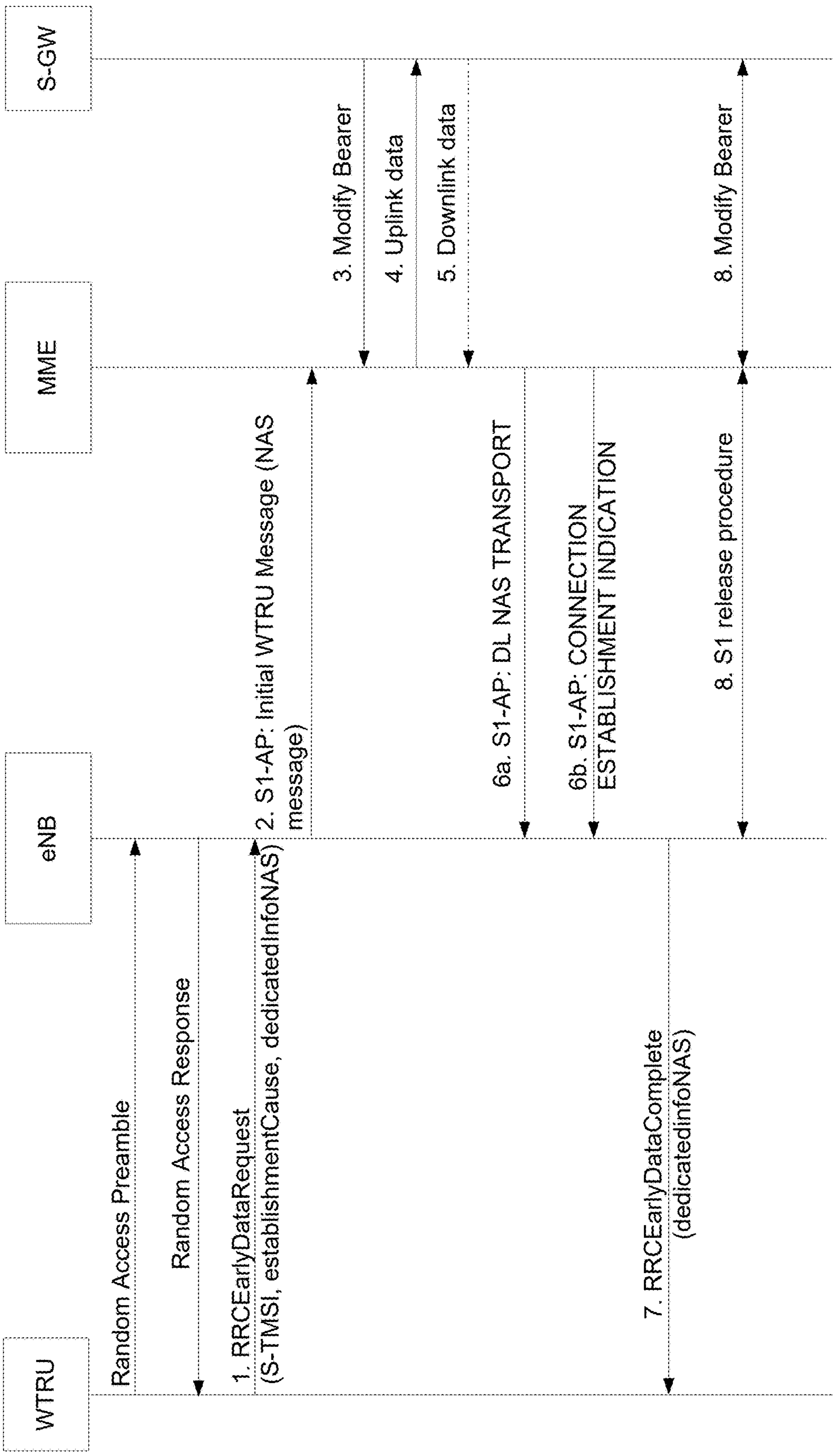
FIG. 5 illustrates an example of an MO-EDT procedure for Control Plane CIoT EPS Optimization.

An example of an MO-EDT procedure for Control Plane CIoT EPS optimization is illustrated in FIG. 5.

FIG. 5 illustrates an example of an MO-EDT procedure for Control Plane CIoT EPS Optimization.

Mobile terminated early data transmission (MT-EDT) may be used, for example, for a single downlink data transmission during the random access procedure.

MT-EDT may be initiated by the mobility management entity (MME), for example, if the WTRU and the network support MT-EDT and/or if there is a single downlink (DL) data transmission for the WTRU.

Figure 6:
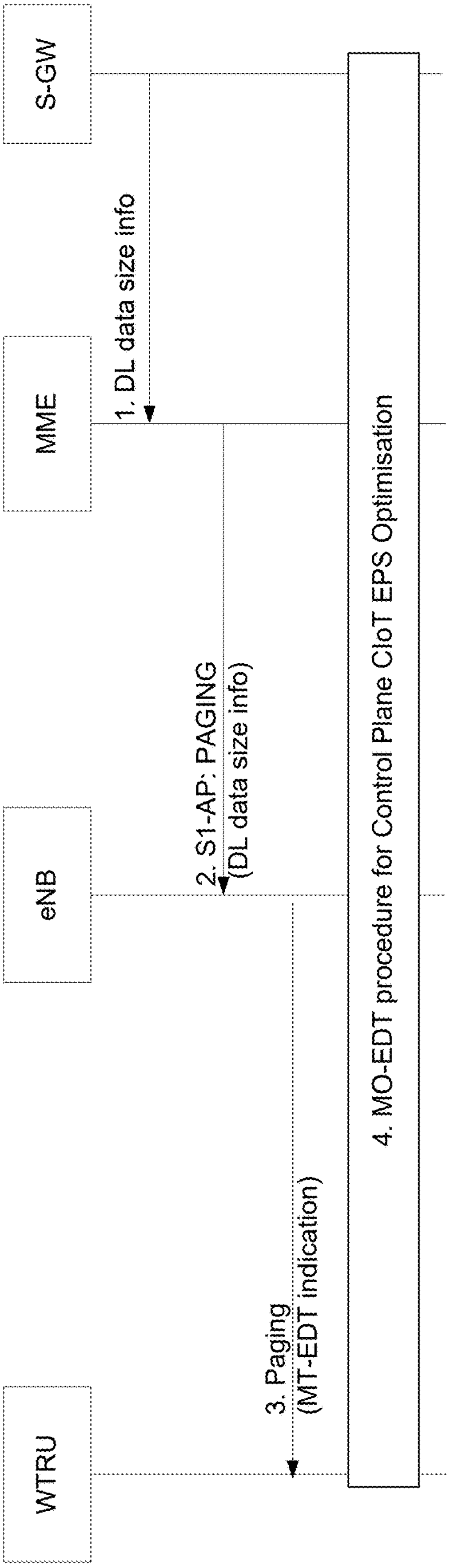
FIG. 6 illustrates an example of an MT-EDT procedure for Control Plane CIoT EPS Optimization.

An example of an MT-EDT procedure for Control Plane CIoT EPS Optimization is illustrated in FIG. 6.

FIG. 6 illustrates an example of an MT-EDT procedure for Control Plane CIoT EPS Optimization.

Transmission using a preconfigured uplink resource (PUR) may allow a (e.g., one) uplink transmission from RRC_IDLE using a preconfigured uplink resource without performing the random access procedure.

Transmission using PUR may be enabled by the (ng-) eNB, for example, if the WTRU and the (ng-)eNB provide support.

A WTRU may request to be configured with a PUR or may request to have a PUR configuration released while in RRC_CONNECTED mode. The (ng-)eNB may decide to configure a PUR. The decision may be based on, for example, a WTRU's request, a WTRU's subscription information, and/or local policy. The PUR may be valid (e.g., only) in the cell where the configuration was received.

Transmission using PUR may be triggered, for example, if/when the upper layers request the establishment or resumption of the RRC Connection and/or if the WTRU has a valid PUR for transmission and/or meets the timing advance (TA) validation criteria.

A procedure for a PUR configuration request and a PUR configuration may be common to the Control Plane CIoT EPS/5GS optimizations and the User Plane CIoT EPS/5GS optimizations. An example of PUR Configuration Request and PUR configuration is illustrated in FIG. 7.

Figure 7:
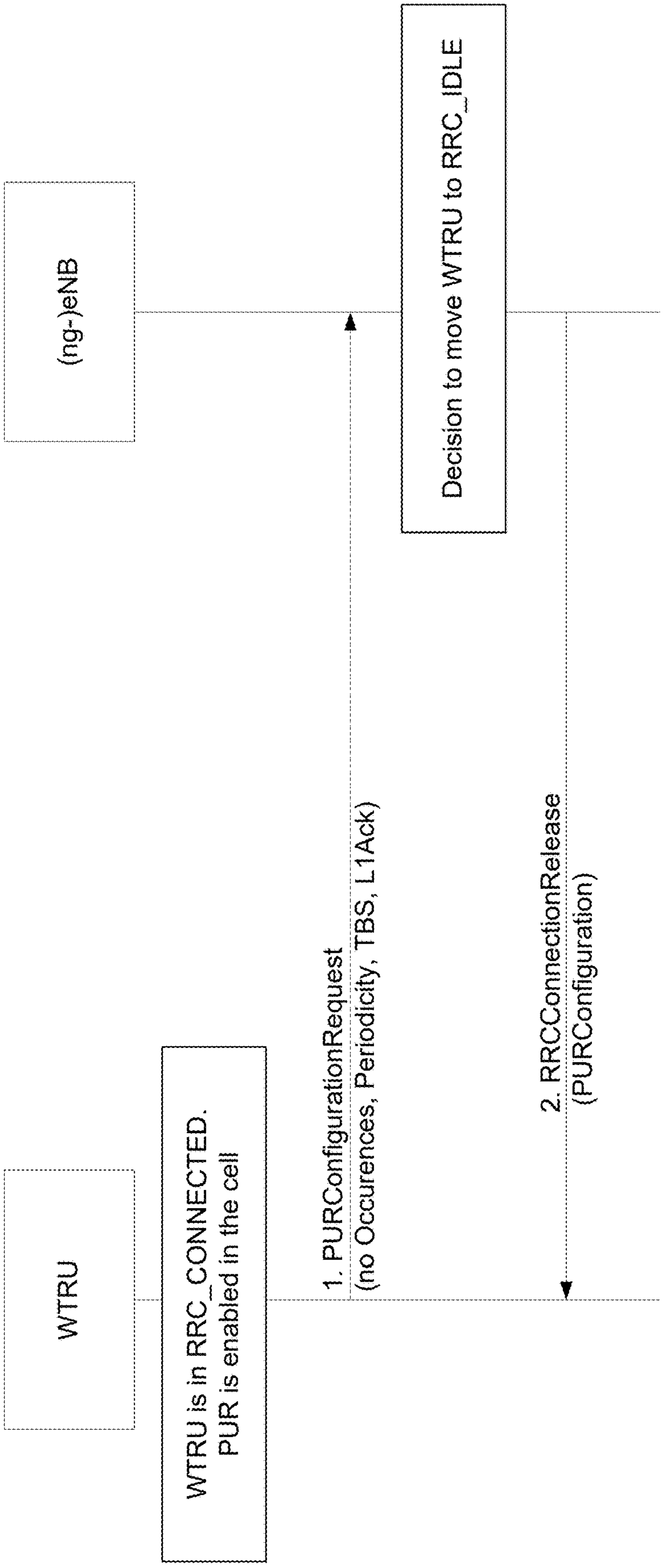
FIG. 7 illustrates an example of a PUR Configuration Request and a PUR Configuration.

FIG. 7 illustrates an example of a PUR Configuration Request and a PUR Configuration.

Figure 8:
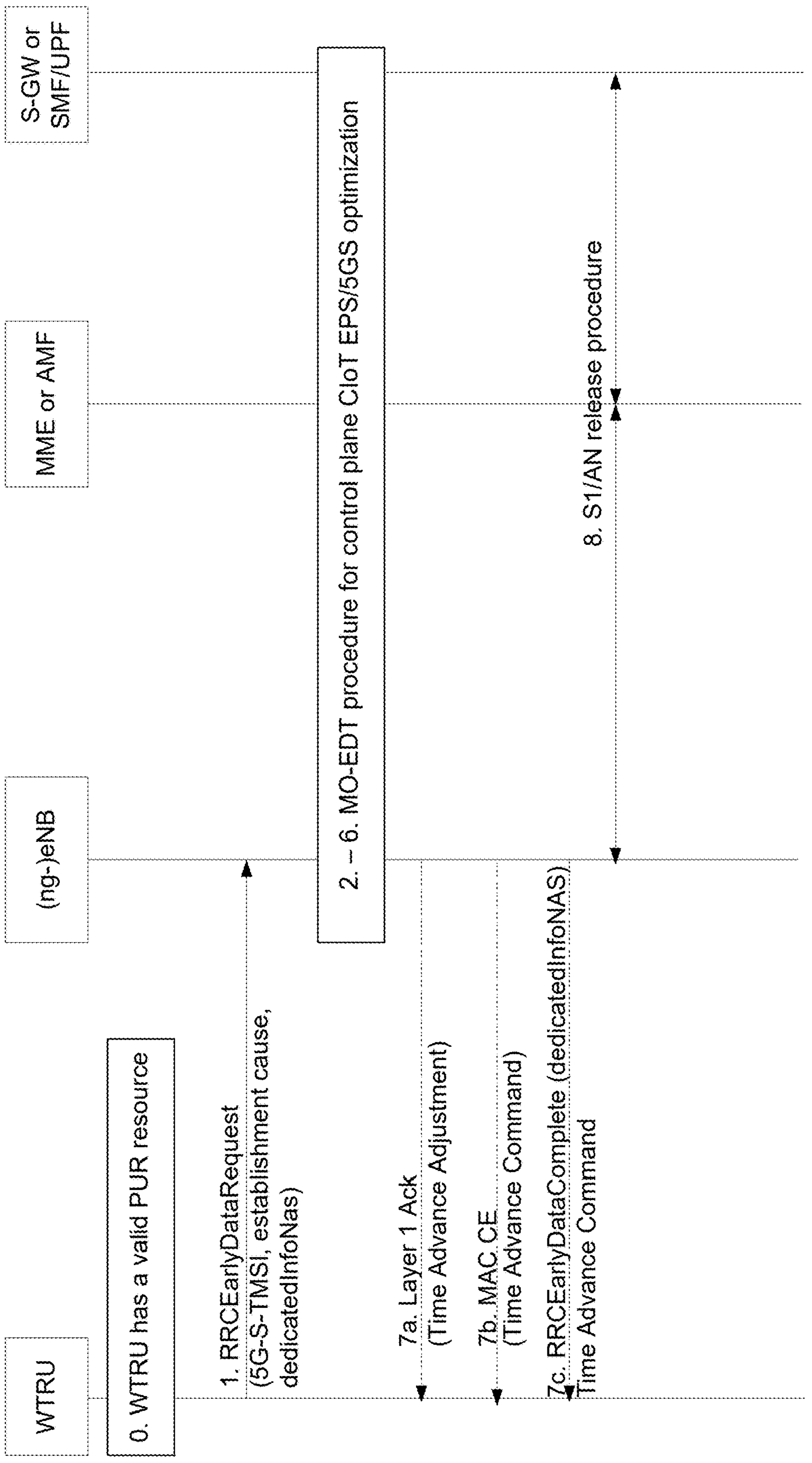
FIG. 8 illustrates an example of transmission using PUR for the Control Plane CIoT EPS/5GS Optimizations.

An example of a procedure for transmission using PUR for the Control Plane CIoT EPS optimization and for the Control Plane CIoT 5GS optimization is illustrated in FIG. 8.

FIG. 8 illustrates an example of transmission using PUR for the Control Plane CIoT EPS/5GS Optimizations.

An NTN (e.g., a basic NTN) may include an aerial or space-borne platform which, e.g., via a gateway (GW), transports signals from a land-based gNB to a WTRU and vice-versa. Support for LTE-based narrow-band loT (NB-IoT) and eMTC type devices may be implemented. NTN WTRUs may be (e.g., assumed to be) global navigation satellite system (GNSS) capable, for example, regardless of device type.

Aerial or space-borne platforms may be classified in terms of orbit, such as low-earth orbit (LEO) satellites with an altitude range of 300-1500 km and geostationary earth orbit (GEO) satellites with altitude at 35 786 km. Other platform classifications, such as medium-earth orbit (MEO) satellites with altitude range 7000-25000 km and high-altitude platform stations (HAPS) with altitude of 8-50 km, may be (e.g., assumed to be implicitly) supported. Satellite platforms may be (e.g., further) classified as having a "transparent" or "regenerative" payload. Transparent satellite payloads may implement frequency conversion and/or RF amplification in uplink and/or downlink, for example, with multiple transparent satellites that may be (e.g., possibly) connected to one land-based gNB. Regenerative satellite payloads can implement a full gNB and/or gNB distributed unit (DU) onboard the satellite. Regenerative payloads may perform digital processing on the signal, which may include demodulation, decoding, re-encoding, re-modulation, and/or filtering.

Figure 9:
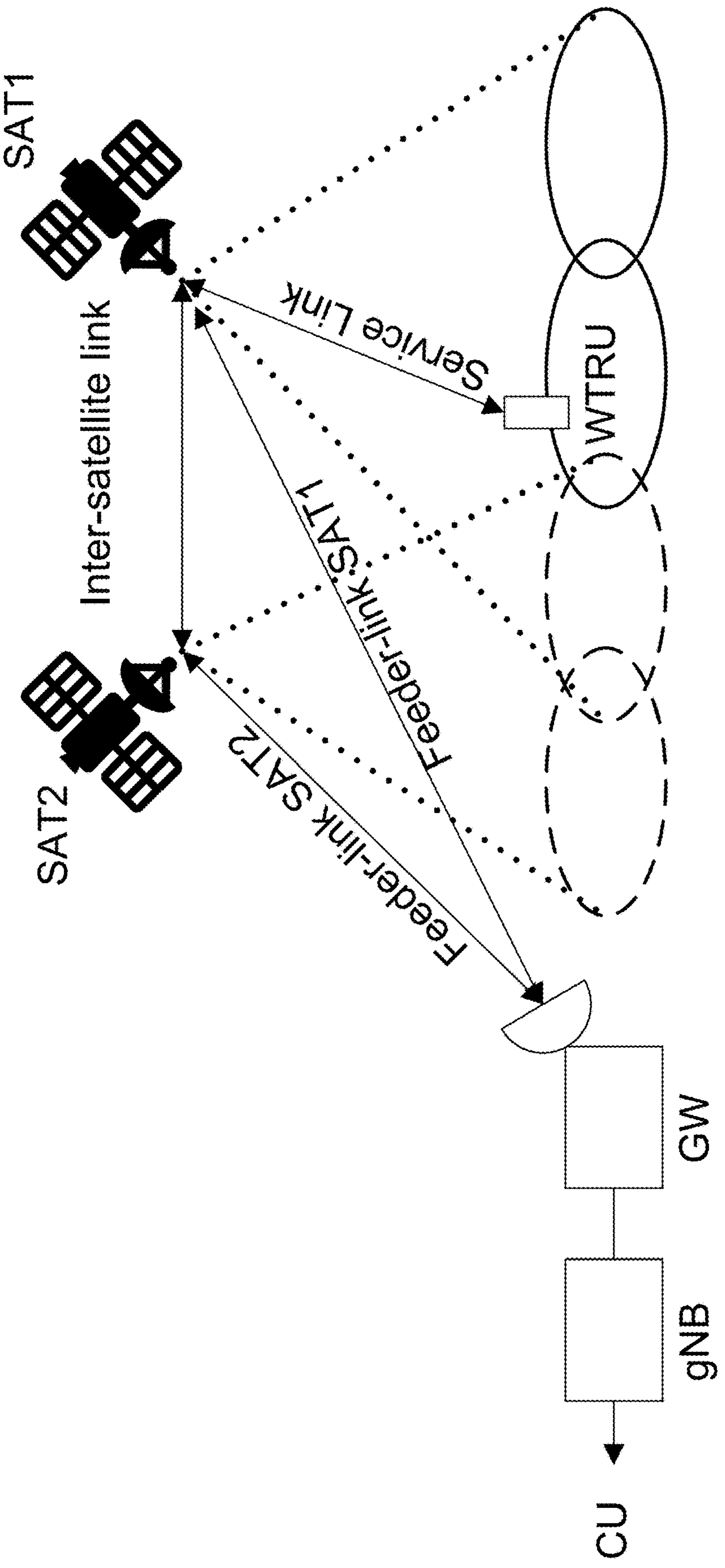
FIG. 9 illustrates an example of a depiction of the different interfaces in a non-terrestrial network.

The following radio interfaces may be utilized (e.g., defined) in NTN, which is shown by example in FIG. 9: feeder link, service link, and inter-satellite link (ISL). A feeder-link may be a wireless link between the GW and satellite. A service link may be a radio link between the satellite and WTRU. An inter-satellite Link (ISL) may be a transport link between satellites. The ISL may be supported (e.g., only) by regenerative payloads. The ISL may be, for example, a 3GPP radio or proprietary optical interface.

FIG. 9 illustrates an example of a depiction of the different interfaces in a non-terrestrial network.

An NTN satellite can support multiple cells. A (e.g., each) cell may include one or more satellite beams. Satellite beams cover a footprint on earth (e.g., like a terrestrial cell). Satellite beams can range in diameter. For example, satellite beam diameter may be 100-1000 km in LEO deployments and 200-3500 km in GEO deployments. Beam footprints in GEO deployments may remain fixed relative to Earth. The area covered by a beam/cell (e.g., in LEO deployments) may change over time, for example, due to satellite movement. The beam movement may be classified as “earth moving,” where the LEO beam moves (e.g., continuously) across the earth, or “earth fixed,” where the beam is steered to remain covering a fixed location, for example, until a new cell overtakes the coverage area, e.g., in a discrete and coordinated change.

Due to the altitude of NTN platforms and beam diameter, the round-trip time (RTT) and maximum differential delay may be significantly larger than the RTT and maximum differential delay associated with terrestrial systems. In some examples of NTN deployments (e.g., a typical transparent NTN deployment), RTT can range from 25.77 ms (LEO @600 km altitude) to 541.46 ms (GEO) and maximum differential delay from 3.12 ms to 10.3 ms. The RTT of a regenerative payload may be approximately half the RTT of a transparent payload, e.g., since a transparent configuration includes both the service and feeder links, whereas the RTT of a regenerative payload considers (e.g., only) the service link. A WTRU may perform timing pre-compensation (e.g., prior to initial access), for example, to minimize impact to existing (e.g., NR) systems (e.g., to avoid preamble ambiguity or properly time reception windows).

A pre-compensation procedure may include the WTRU obtaining its position (e.g., via GNSS) and/or obtaining the feeder-link (or common) delay and satellite position (e.g., via satellite ephemeris data). The satellite ephemeris data may be (e.g., periodically) broadcast in system information. The satellite ephemeris data may include the satellite speed, direction, and/or velocity. The WTRU may estimate the distance (e.g., and thus delay) from the satellite. The WTRU may add the feeder-link delay component to obtain the full WTRU-eNB RTT, which may be used to offset timers, reception windows, and/or timing relations. Frequency compensation may be performed by the network.

WTRU mobility and measurement reporting may be enhanced in NTN. The difference in reference signal received power (RSRP) between cell center and cell edge in NTNs may not be as pronounced as in terrestrial systems. The reduced difference in RSRP from cell edge to cell center coupled with the much larger region of cell overlap may result in traditional measurement-based mobility being less reliable in an NTN environment. Therefore, conditional handover and measurement reporting triggers may rely on location and time, e.g., for NR and/or IoT-NTN. Enhanced mobility may be of interest in LEO deployments where (e.g., due to satellite movement) even a stationary WTRU may be expected to perform mobility approximately every seven (7) seconds (e.g., depending on deployment characteristics).

Uplink capacity may be enhanced using PUR in an NTN deployment. NB loT NTN UL system capacity may be limited (e.g., severely limited) by the corresponding system DL capacity, for example, due to the larger signaling overhead in the downlink (e.g., up to ~53%) and the tight coupling between UL and DL signaling. Capacity limitation may (e.g., also) impact predominantly UL driven traffic, such as Mobile Originated (MO) transmissions, which may be the primary target of massive loT and initial emergency messaging use cases supported by loT NTN. The additional UL capacity potential may be unlocked, for example, by methods that decouple the UL from the DL, e.g., as much as possible. Improving system capacity via reduced DL signaling and/or techniques such as contention-based PUR and orthogonal cover coding (OCC) may be critical to meet the capacity demands and/or to ensure economic viability.

IoT NTN uplink capacity may be enhanced, for example, by reducing uplink and downlink signaling to complete an Early Data Transmission (EDT) transaction (e.g., a Msg3 transmission may be implemented without msgl/Random Access Response (RAR) and/or by implementing efficient delivery (e.g., reduced overhead) of msg4/RRCEarlyDataComplete.

The performance of early data transmission (EDT) may be improved, for example, using a (e.g., an existing) (pre) configured uplink resource (PUR) feature.

An Msg3 transmission without an msgl/RAR may be supported with PUR, e.g., as described herein. A WTRU may indicate whether an RRC response is preferred during the PUR configuration request. The eNB can use an L1 acknowledge (ACK) or a medium access control (MAC) control element (CE), e.g., instead of an RRC response, to terminate the PUR procedure.

EDT with PUR may have some limitations that limit the uplink capacity. The limitations may be caused by downlink signaling overhead in an NTN context.

PUR may re-use an EDT procedure, which may, therefore, rely on UL and DL RRC and NAS signaling exchange. For example, there may (e.g., always) be an associated downlink signaling overhead, even when only uplink data needs to be transmitted. An L1 ACK or MAC CE may be used to terminate the procedure. An L1 ACK or MAC CE may rely on application layer knowledge in the eNB, which (e.g., usually) may not be possible. An efficient delivery (e.g., reduced overhead) of msg4/RRCEarlyDataComplete may address the lack of application layer knowledge in the eNB.

With NTN, TA adjustment operations (e.g., DL signaling) may be skipped in the PUR procedure (e.g., since NTN supports timing pre-compensation based on positioning information). A response may be skipped in the DL, for example, for at least some transmissions.

A WTRU may indicate a preference for RRC acknowledgement in the PUR request. A PUR request may not indicate for a given transmission whether an application layer response is expected.

One or more features described herein may enable determining an EDT transmission completion (e.g., for an EDT procedure under which EDT transmission(s) were sent, determining that no more EDT transmission(s) can be sent) without receiving a communication from the network (e.g., without receiving an “RRC Early Data Complete” message from a network entity, such as a base station). A WTRU may determine a mode (e.g., EDT completion response mode) to use for performing EDT (e.g., to use in association with sending an EDT transmission). The WTRU may determine the mode based on one or more of: an indication that data is available (e.g., EDT data), indicated EDT configuration(s), or indicated condition(s) associated with the indicated EDT configurations (e.g., respective condition(s) associated with a respective EDT configuration). The mode may indicate one or more of the following: whether an early data complete message is expected, when the early data complete message is expected (e.g., after how many EDT transmissions), how to receive an early data complete message, or how to determine successful completion of EDT (e.g., the EDT procedure).

Features described herein may be associated with EDT transmission and/or determining completion of an EDT procedure. For example, one or more of the following may be performed by a WTRU. A WTRU may receive configuration information associated with EDT completion (e.g. the received configuration information may be indicated via system information). The WTRU may determine to trigger an uplink transmission using EDT (e.g., may determine that an uplink transmission using EDT is triggered), e.g., based on a data request from an application (e.g., an indication that data is available, for example available for EDT). The WTRU may determine, select, and/or use an EDT completion response mode, for example based on one or more of the following: an indication that data is available (e.g., EDT data), indicated EDT configuration(s), or indicated condition (s) associated with the indicated EDT configurations (e.g., respective condition(s) associated with a respective EDT configuration). The WTRU may transmit an RRC early data request message to the network (e.g., the WTRU may send an uplink EDT transmission to a network entity, such as base station, where the uplink EDT transmission includes uplink data, for example the uplink data indicated by the data request). The WTRU may determine that the EDT procedure is or is not completed (e.g., the WTRU may send additional uplink EDT transmission(s) if the EDT procedure is not determined as completed). The WTRU may continue in or return to an idle condition (e.g., RRC IDLE) and monitor for paging (e.g., monitor for a paging message).

The received configuration information associated with EDT completion may include: an indication of one or more EDT completion response mode configurations; and/or a set of one or more conditions associated with the one or more EDT completion response mode configurations (e.g., respective condition(s) associated with a respective EDT configuration). An EDT completion response mode configuration may indicate whether a completion response is to be received: via RRC, via L1 ACK, via MAC CE, via a common ACK message (e.g. group acknowledgement for multiple WTRUs), or no response is expected, and in some examples an associated time window e.g. for monitoring for a retransmission indication (e.g., in examples this could be: an indication of failure; an indication to retransmit the data/EDT request; and/or an indication that no NACK has been received during a time duration). A set of one or more conditions associated with a respective EDT completion response mode configuration may include a respective one or more of: RSRP threshold, TA validity condition (e.g. timer since TA was acquired not expired, threshold distance since acquired, etc.); a number of times (e.g. subsequent EDT procedures) the optimized (e.g. unacknowledged) procedure may be used before using a complete (e.g. acknowledged) procedure; a pattern of transmission procedure types (e.g., perform 1 UM, 1 AM, then 2 UM, 1 AM); or a size of data or TBS satisfying a threshold.

The WTRU determining that an uplink transmission using EDT is triggered may be based on a data request from an application. The WTRU may receive an indication from the application that a downlink application layer response message is not expected for this EDT transmission. In some examples, the received indication may be included in the data request from an application.

The WTRU may, as described herein, transmit an RRC early data request message to the network (e.g., the WTRU may send an uplink EDT transmission to a network entity, such as base station, where the uplink EDT transmission includes uplink data, for example the uplink data indicated by the data request). The WTRU may indicate (e.g., in the uplink EDT transmission) an indication that no application layer response is expected or an indication of the selected EDT completion mode response configuration (e.g. using an index, for example, in case more than one is possible). In some examples, if an application layer response is expected, a default may be "acknowledged" operation (e.g., WTRU may expect RRCEarlyDataComplete).

The WTRU may determine that the EDT procedure is completed based on the configured selected EDT completion mode response configuration and the condition for determining the procedure completion having been detected. The condition being detected may comprise detecting one or more of the following: reception of an L1 ACK, reception of a MAC CE, reception of an RRC complete message, detection of a common ACK (e.g., the WTRU may monitor for and/or receive a PDSCH message using a common RNTI), or determine a lack of NACK reception during a time duration (e.g., the WTRU may monitor a PDCCH and determine that no NACK has been received during a time duration).

In some examples, a WTRU may perform EDT and waits for RRCEarlyDataComplete in case the application layer indicates a response is expected or may be expected or a condition is met to use the acknowledged procedure (e.g. RSRP too low, threshold number of UM attempts used, etc.).

Figure 10:
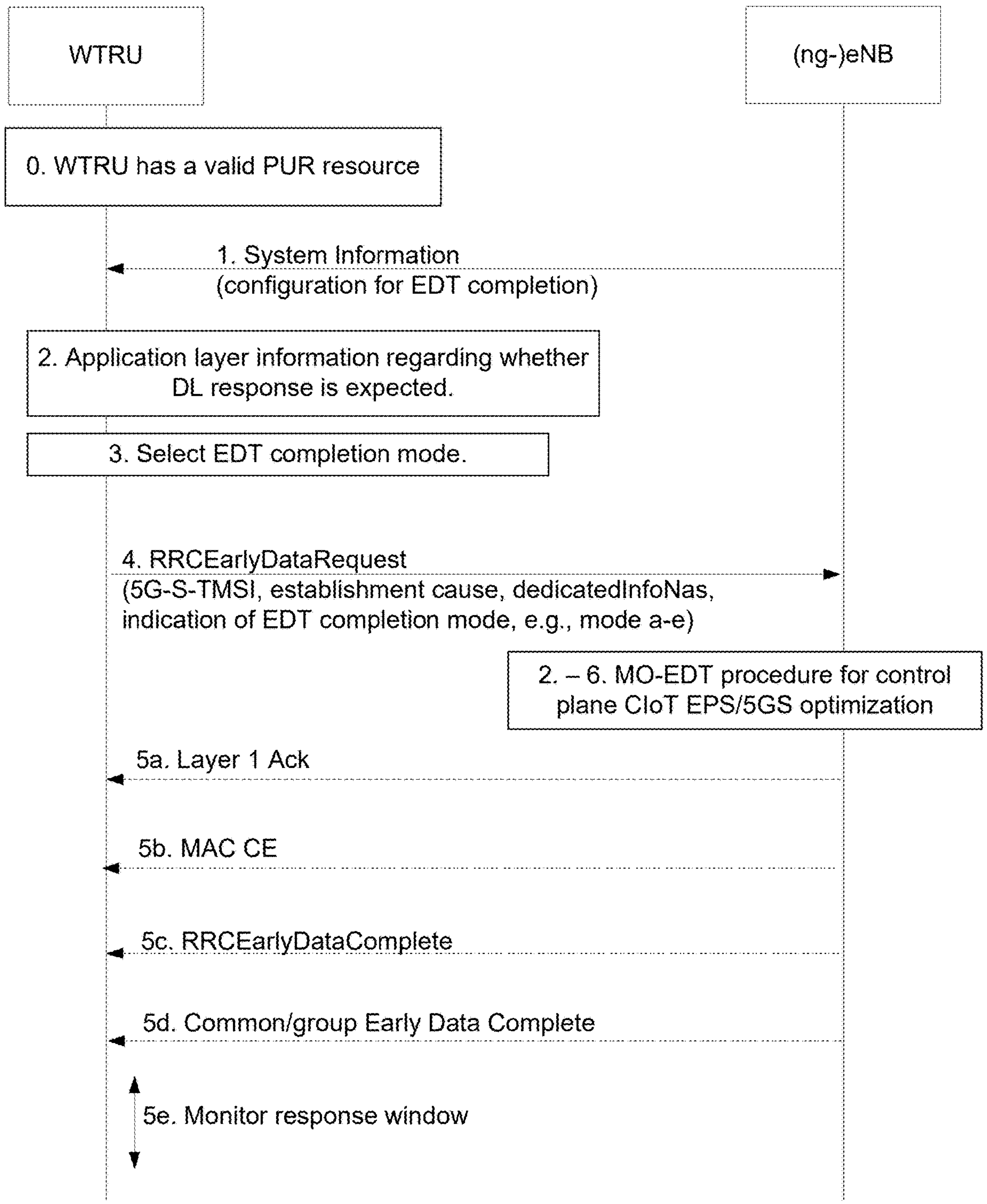
FIG. 10 illustrates an example of determining EDT transmission completion without reception of "RRC Early Data Complete."

FIG. 10 illustrates an example EDT transmission and/or determining completion of an EDT procedure. The features associated with 2, 3, and 4 in FIG. 10 may be performed multiple times before completion (e.g., as described herein). In some examples, a WTRU may (e.g., at 2/3) select the acknowledged procedure.

In some cases, features described herein associated with EDT transmission and/or determining completion of an EDT procedure may be associated with one or more of the following: allowing improved uplink capacity, e.g., due to minimizing limitation due to excessive downlink signaling by enabling EDT without RRCEarlyDataComplete; enabling improved handling of downlink response message by using WTRU application layer information, e.g., to determine whether there is a need to receive downlink NAS data (e.g., in RRCEarlyDataComplete); provide more flexibility than configuring the ACK type based on PUR request, e.g., the procedure may be determined and/or configured per transmission, which may allow greater efficiency (e.g., the WTRU may be configured to terminate the procedure when no application layer response is expected, and can be configured to wait for the response when an application layer response is expected (e.g., to avoid having to page and perform a second procedure); allowing for improved reliability, e.g., compared to relying on L1 ACK or compared to no ACK.

FIG. 10 illustrates an example of determining EDT transmission completion, e.g., without reception of "RRC Early Data Complete" (e.g., in all cases).

Examples are described in the context of a NB-IoT device operating in an IoT-NTN (satellite based) network. Examples may also (e.g., equally) apply to any type of device operating on any network. For example, examples described herein may be applied to an LTE device, an eMTC device, an NR device, and so on. The network node may be satellite based, a terrestrial network (e.g., an eNB, gNB), a relay node, airborne, moving, and/or fixed.

A configuration for EDT completion may be a dedicated configuration and/or a broadcast/common configuration.

A configuration for EDT completion may be a dedicated configuration. In some examples, a WTRU may receive a dedicated configuration enabling selection of one or more EDT completion modes. For example, the WTRU may receive an RRC Reconfiguration including the configuration for the current cell or one or more other cells, or the WTRU may receive a PUR configuration in RRC Connection Release, which may include an EDT response mode configuration.

A WTRU may (e.g., additionally or alternatively) receive a common configuration. For example, a WTRU may (e.g., additionally or alternatively) receive a broadcast configuration, e.g., in System information. A broadcast configuration may include the configuration of one or more modes that may be used in the current cell (e.g., the cell on which system information is received, and on which an EDT transmission may occur).

A broadcast configuration may be used in conjunction with a dedicated configuration previously received. For example, a WTRU may be configured to use modes configured in the dedicated and/or the common configuration.

In some examples, a WTRU may be configured to be allowed to use modes 1, 2, and 3 using dedicated signaling. A particular cell may allow modes 2, 3, 4 according to the broadcast configuration. Accordingly, the specific WTRU may be allowed to use modes 2 and 3 (e.g., since mode 1 isn't allowed in the cell).

In some examples, one or more (e.g., some) specific parameters may be provided in dedicated signaling, while one or more (e.g., some) default parameters may be provided in broadcast signaling. A WTRU may use the values provided in broadcast signaling, for example, if the WTRU has not received a dedicated configuration. A WTRU may use values provided by dedicated signaling, for example, if the WTRU received a dedicated configuration. For example, broadcast signaling may enable modes 1 and 2 while dedicated signaling configures the WTRU to use mode 3. The WTRU may, therefore, use mode 3.

Any combination of parameters and configurations may be allowed by combining broadcast and dedicated signaling.

A configuration may include one or more parameters. In some examples, a configuration may include one or more EDT completion response mode configuration types, which may include, for example, one or more of the following: response is received via RRC; via L1 ACK; MAC CE; via a common ACK message (e.g., group acknowledgement for multiple WTRUs); and/or no response is expected, and/or optionally an associated time window, e.g., for monitoring for a retransmission indication.

In some examples, a configuration may include a set of conditions associated with a (e.g., each) EDT completion response mode configuration. The set of condition may include, for example, one or more of the following: a radio quality (e.g., RSRP, RSRQ) threshold; a TA validity condition (e.g., time since TA was acquired, threshold distance since acquired, etc.); a mobility or speed threshold (e.g., use a particular mode if the WTRU velocity is above or below a threshold); a location condition (e.g., use a particular mode if the distance from a reference location is within a specified threshold distance); a time condition (e.g., use a particular mode during a specified time interval); a number of times (e.g., subsequent EDT procedures) the optimized (e.g., unacknowledged) procedure may be used before using a complete (e.g., acknowledged) procedure; a pattern of transmission procedure types (e.g., perform 1 UM, 1 AM, then 2 UM, 1 AM); a size or amount of data (e.g., transport block size (TBS)); and/or based on the validity of WTRU location information (e.g., the time since the WTRU last acquired GNSS information, or whether a timer associated with WTRU location information acquisition is still running).

A WTRU may receive assistance information (e.g., additional assistance information) to evaluate whether a particular EDT response mode is valid. Examples of assistance information may include, for example, one or more of the following: a reference point; satellite ephemeris data (e.g., satellite location, direction, speed, and/or orbital parameters); epoch time of satellite assistance information; satellite footprint information, such as radius of cell footprint; and/or WTRU location information (e.g., GNSS information).

Application information (e.g., application assistance information, such as application layer assistance information) may be provided. For example, information may be provided from upper layers.

In some examples, information may be provided from the device application layer (e.g., operating system or specific application on a device) to the radio access protocol (e.g., device chipset) regarding the traffic pattern or type of traffic expected.

The application layer information may be device specific, application specific, or specific to an individual data exchange. The indication may be provided, for example, in one or more of the following ways: once (e.g., when the device is powered on); at the start of a session (e.g., a reporting session starts, and multiple transmissions may be expected in the session); and/or at the beginning of every uplink transmission.

Information provided by the application/upper layers may include, for example, one or more of the following: a transmission data amount; a response type; a data priority; a data periodicity; and/or a number of occurrences.

A transmission data amount may indicate, for example, one or more of the following: a transport block size, an SDU/PDU size, and/or the amount of bit or bytes of information.

A response type may indicate, for example, one or more of the following: whether an application layer response is expected from the network; how frequently an application layer response is expected (e.g., once every X transmissions); when a response is expected (e.g., immediately, within seconds, hours, etc.); and/or how much data is expected in the response (e.g., see transmission data amount).

A data priority may indicate, for example, whether the information is critical.

A data periodicity may indicate, for example, how frequently data is expected to be transmitted, such as every X seconds.

A number of occurrences may indicate, for example, how many times data is expected within a certain time period; and/or an absolute number of occurrences.

A WTRU may provide an indication to the network. For example, the WTRU may indicate to the (ng-)eNB that it is interested in being configured with PUR by sending PUR-ConfigurationRequest message providing information about the requested resource (e.g., number of occurrences, periodicity, time offset, TBS, RRC Ack, etc.). In some examples, the WTRU may (e.g., additionally) provide application layer information to the network (e.g., whether application layer is expected to response, etc.). The information may be conveyed in an RRC message (e.g., PURConfigurationRequest) when requesting a preconfigured uplink resource.

The information may be conveyed in an RRC message, for example, based on (e.g., upon) initiating an uplink data transmission, which may include uplink user data transmitted using a PUR resource in an NAS message concatenated in an RRCEarlyDataRequest message on a common control channel (CCCH).

The information may be provided, for example, using one or more of the following methods: an RRC message; an NAS message (e.g., REGISTRATION REQUEST, TRACKING AREA UPDATE REQUEST, etc.); implicitly by selecting a specific random access channel (RACH) preamble or a preamble from a specific group of preambles; implicitly by selecting a specific PUR resource (e.g., narrowband physical uplink shared channel (NPUSCH) resources) or a resource from a specific group of PUR resources; in an MAC CE; and/or in uplink control information (e.g., narrowband physical uplink control channel (NPUCCH)).

Multiple EDT completion response modes may be implemented.

An EDT completion response mode may include a mode where an (ng-)eNB may send (e.g., and a WTRU may receive) an L1 Acknowledgement. An (ng-)eNB may send a Layer 1 ACK (e.g., optionally including a Time Advance Adjustment) to the WTRU to update the TA and terminate the procedure, for example, if the (ng-)eNB is aware that there is no pending downlink data or signaling.

In some examples, a timing advance may not be provided. The (ng-)eNB may send an L1 acknowledgement message informing the WTRU to terminate the procedure. The L1 acknowledgement may, for example, include an implicit or explicit indication that the WTRU may use a WTRU-based timing pre-compensation measurement for a subsequent early data transmission. The WTRU may receive an L1 acknowledgement indicating successful completion of the EDT procedure (e.g., successful reception by the eNB of the uplink data).

In some examples, an L1 acknowledgement may provide an indication of the EDT completion response type to use on a subsequent uplink transmission. For example, an L1 ACK may indicate that L1 ACK may be used on the next uplink transmission, or may indicate that an RRC response may be used on the next uplink transmission.

In some examples, an L1 ACK may provide an indication of the EDT completion response type to use on a subsequent uplink transmission. For example, an MAC CE may indicate that L1 ACK may be used on the next uplink transmission, or may indicate that an RRC response may be used on the next uplink transmission.

In some examples, an L1 ACK may include an indication of resources to use on a subsequent transmission (e.g., a PUR resource).

An (ng-)eNB may send an MAC CE. An (ng-)eNB may send a Time Advance Command (e.g., in an MAC CE) to update the TA and terminate the procedure, for example, if the (ng-)eNB is aware that there is no further data or signaling.

In some examples, a timing advance may not be provided. An (ng-)eNB may send an MAC CE message informing the WTRU to terminate the procedure. The MAC CE acknowledgement may, for example, include an implicit or explicit indication that the WTRU may use a WTRU-based timing pre-compensation measurement for a subsequent early data transmission. The WTRU may receive an MAC CE indicating successful completion of the EDT procedure (e.g., successful reception by the eNB of the uplink data). The WTRU may receive an MAC CE including information regarding the success (e.g., ACK, NACK) of multiple previous uplink transmissions. The MAC CE may include ACK/NACK information for the previous X transmissions, for example, if X uplink transmissions have occurred without using an acknowledgement.

An EDT completion response mode may include a mode where a MAC CE may provide an indication of the EDT completion response type to use on a subsequent uplink transmission. For example, the MAC CE may indicate that an L1 ACK may be used on the next uplink transmission, or may indicate that an RRC response may be used on the next uplink transmission.

In some examples, the MAC CE may include an indication of resources to use on a subsequent transmission (e.g., a PUR resource).

An EDT completion response mode may include a mode where an (ng-)eNB may send (e.g., an a WTRU may receive) an RRC Response. In some examples, an (ng-)eNB can send the RRCEarlyDataComplete message on CCCH to keep a WTRU in RRC_IDLE. Downlink data (e.g., application layer response data), if received, may be concatenated in the RRCEarlyDataComplete message, for example, in an NAS container (e.g., dedicatedInfoNAS).

Similar to L1 ACK and MAC CE, in some examples, a timing advance may not be provided. An (ng-)eNB may send an RRC response (e.g., RRCEarlyDataComplete). An RRC acknowledgement may, for example, include an implicit or explicit indication that the WTRU may use a WTRU-based timing pre-compensation measurement for a subsequent early data transmission. The WTRU may receive an RRC message indicating successful completion of the EDT procedure (e.g., successful reception by the eNB of the uplink data). The WTRU may receive an RRC message including information regarding the success (e.g., ACK, NACK) of multiple previous uplink transmissions. The RRC message may include ACK/NACK information for the previous X transmissions, for example, if X uplink transmissions have occurred without using an acknowledgement.

In some examples, an RRC message may provide an indication of the EDT completion response type to use on a subsequent uplink transmission. For example, the RRC message may indicate that an L1 ACK may be used on the next uplink transmission, or may indicate that an RRC response may be used on the next uplink transmission.

In some examples, an RRC message may include an indication of resources to use on a subsequent transmission (e.g., a PUR resource).

In some examples, a WTRU may perform a random access procedure before transmitting an Early data request. For example, the WTRU may send a random access preamble (e.g., Msg1). The WTRU may receive a random access response (RAR) (e.g., Msg2). In Msg3, the WTRU may send an early data request using RRC signaling. The WTRU may receive an early data complete in Msg4, e.g., using RRC signaling. For example, the WTRU may not use any PUR, but may perform EDT, e.g., in accordance with the example described herein (e.g., in FIG. 5). The WTRU may use a random access preamble dedicated for EDT, which may be indicated by the cell (e.g., in system information). In some examples, the WTRU may use dedicated RACH occasions, or a combination of RACH occasion and preamble. In some examples, the random access preamble selected by the WTRU may indicate the selected EDT response mode. For example, the WTRU may select from one or more random access preambles configured by the network to be used if/when a particular EDT response mode is selected.

An EDT completion response mode may include a mode where a network may provide (e.g., an WTRUs may monitor for) a common/bundled acknowledgement. For example, a network may acknowledge multiple transmissions in a single response message. A response message may, for example, acknowledge several transmissions from the same WTRU. For example, a WTRU may transmit X times using EDT. On the Xth transmission the WTRU may wait for a downlink response. For example, a WTRU may transmit four times. The first, second, and third transmission may occur without downlink acknowledgement. The fourth transmission may be followed with a downlink acknowledgement indicating whether some or all of the four transmissions were successfully received.

In some examples, the network may acknowledge transmissions from multiple devices. For example, a downlink message may be transmitted by the network on a PDSCH using a common or group radio network temporary identifier (RNTI) (e.g., group common signaling, or broadcast signaling). WTRUs may be assigned to monitor the specific RNTI. The WTRUs may receive the common acknowledgement message. WTRUs may be configured to determine, for example, based on one or more specific elements in the common message, whether the transmission made by each WTRU was successful. For example, the common acknowledgement message may include a bitmap of 32 bits, each corresponding to one of 32 WTRUs. Each of the 32 WTRUs may be assigned an index. The index assigned to a WTRU may correspond to a bit that indicates the acknowledgement for the WTRU.

In some examples, an acknowledgement may be received as a binary ACK/NACK. Devices (e.g., all devices) configured to receive a common indication may interpret an ACK as an indication that the transmission was successful and a NACK as an indication that the transmission was not successful. For example, the network may indicate a "NACK" if any of the transmissions from the N WTRUs using a common indication was not successful. WTRUs (e.g., all WTRUs) using the common indication may determine that their transmission has failed based on the common indication of NACK.

An EDT completion response mode may include a mode where a WTRU may monitor for a retransmission indication. For example, a WTRU may be configured to monitor for a retransmission indication or NACK in the downlink. The WTRU may be configured with a timer during which the monitoring may occur. The WTRU may consider the transmission as successful and terminate the procedure, for example, if the timer expires without receiving an indication. For the majority of (e.g., successful) transmissions, there may not be any associated downlink overhead. A WTRU may receive a downlink indication, for example, (e.g., only) if a transmission is unsuccessful.

In some examples, a WTRU may receive an (e.g., a first) indication (e.g., an L1 or a MAC indication) to specify whether the WTRU needs to wait for further downlink information. For example (e.g., if it is unknown whether a response message is expected), the (e.g., first) message may indicate whether the uplink transmission was successful and/or whether the WTRU should expect a downlink response (e.g., application layer response). The WTRU may determine, e.g., based on the indication, that the uplink transmission was successful and/or that there is no further downlink transmission. The WTRU may (e.g., based on the determination) consider the transmission to have been successful and terminate the procedure. The WTRU may not terminate the procedure and may monitor for downlink scheduling of further information (e.g., an RRC message), for example, if the WTRU determines (e.g., based on the indication) that further information may be received.

An EDT completion response mode may include a mode where an uplink transmission may be unacknowledged. For example, a WTRU may perform an uplink transmission and terminate the procedure without waiting for a downlink acknowledgement or message. The WTRU may terminate the procedure and return to idle mode, for example, once the uplink transmission has completed.

Mode selection may be based on one or more mode selection conditions.

In some examples, a set of conditions associated with each EDT completion response mode configuration may be provided to the WTRU as part of the configuration. The WTRU may evaluate one or more of the following conditions, e.g., alone or in any combination, for determining the EDT completion mode to select for one or more EDT procedures.

A WTRU may select a mode based on, for example, whether the application layer has determined a downlink response is expected to the uplink transmission.

A WTRU may select a mode based on, for example, radio quality measurements. For example, if the downlink measurement is above an RSRP threshold, the WTRU may select a particular mode for the response.

A WTRU may select a mode based on, for example, a timing advance (TA) validity condition. For example, a WTRU may select a particular mode for the response if the time since a TA was acquired is below a threshold or if the distance the WTRU has moved since the TA was acquired is below a threshold.

A WTRU may select a mode based on, for example, a mobility or speed threshold. For example, a WTRU may select a particular mode if the WTRU velocity is above or below a threshold.

A WTRU may select a mode based on, for example, a location condition. For example, a WTRU may select/use a particular mode if the distance from a reference location is within a specified threshold distance.

A WTRU may select a mode based on, for example, a time condition. For example, a WTRU may select/use a particular mode during a specified time interval.

A WTRU may select a mode based on, for example, a number of times (e.g., subsequent EDT procedures) the optimized (e.g., unacknowledged) procedure may be used before using a complete (e.g., acknowledged) procedure.

A WTRU may select a mode based on, for example, a pattern of transmission procedure types (e.g., perform 1 UM, 1 AM, then 2 UM, 1 AM).

A WTRU may select a mode based on, for example, a size or amount of data, e.g., transport block size (TBS).

A WTRU may select a mode based on, for example, being configured to use a specific mode in a specific one or more cells.

A WTRU may select a mode based on, for example, being configured to use a specific mode for a particular service or bearer type.

A WTRU may select a mode based on, for example, a network configuration. For example, the network may broadcast a network configuration indicating a specific mode to use, or the network may indicate a mode to use to the WTRU using dedicated signaling. A configuration/indication may be provided, for example, in advance of, or during, the EDT procedure.

A WTRU may select a mode based on, for example, the type of PUR resource selected. For example, a first EDT response mode may be selected if the PUR resource is a dedicated (e.g., WTRU specific) resource and a second EDT response mode may be selected if the PUR resource is a contention-based (e.g., shared) resource. The PUR resource type may be associated with the EDT response type.

A WTRU may select a mode based on, for example, a distance (e.g., of travel) of a WTRU exceeding a threshold (e.g., the WTRU has travelled greater than a distance threshold from the time it received the PUR configuration).

A WTRU may select a mode based on, for example, the distance of (e.g., between) the WTRU and a satellite exceeding a threshold.

A WTRU may select a mode based on, for example, the distance of (e.g., between) the WTRU and a reference point exceeding a threshold.

A WTRU may select a mode based on, for example, the WTRU location information becoming invalid (e.g., the GNSS location information for a WTRU has expired or has become out of date).

A WTRU may select a mode based on, for example, the WTRU location information being received longer than X time ago (e.g., the WTRU received the GNSS location information greater than a time period ago).

A WTRU may select a mode based on, for example, a specific satellite orbit (e.g., the WTRU has transitioned from a GSO to an NGSO satellite and is configured to use a different EDT mode).

A WTRU may use an unacknowledged mode of transmission, for example, until a failure is detected. For example, a WTRU may monitor for a negative acknowledgement during a time window after an (e.g., each) uplink transmission. The WTRU may consider the transmission as successful and/or may use unacknowledged mode on the next transmission, for example, if the timer associated with the time window elapses. The WTRU may consider the transmission as not successful and/or may use an acknowledgement based EDT procedure on a subsequent transmission, for example, if a NACK is received during the time window.

A WTRU may (e.g., additionally and/or alternatively) select a different uplink resource, for example, if a response is not received on one or more attempts.

In some examples, the number of times an unacknowledged EDT procedure may be used may be adjusted based on, for example, the feedback when an acknowledgment-based EDT procedure is used. For example, the WTRU may be configured to use an acknowledgment-based EDT procedure every fourth transmission attempt. The WTRU may adjust the number of times, for example, if the feedback suggests that one of the transmissions failed. For example, the WTRU may adjust the number of times such that the acknowledgement-based EDT procedure is used every second transmission attempt.

In some examples, a WTRU may prioritize use of a particular mode (e.g., unacknowledged) based on one or more of the conditions being met. The WTRU may select a different mode (e.g., acknowledged), for example, if one or more conditions are not met (e.g., or if one or more alternative conditions are met). For example, the WTRU may use an unacknowledged mode of EDT provided that the application layer has determined a downlink response is not expected, and the WTRU may perform an acknowledgement-based EDT procedure every X transmissions using EDT (e.g., perform EDT three times without acknowledgment, then once with acknowledgment to ensure that all of the transmissions were successful).

One or more features described herein may enable determining an EDT transmission completion (e.g., for an EDT procedure under which EDT transmission(s) were sent, determining that no more EDT transmission(s) can be sent) without receiving a communication from the network (e.g., without receiving an "RRC Early Data Complete" message from a network entity, such as a base station). A WTRU may determine a mode (e.g., EDT completion response mode) to use for performing EDT (e.g., to use in association with sending an EDT transmission). The WTRU may determine the mode based on one or more of: an indication that data is available (e.g., EDT data), indicated EDT configuration(s), or indicated condition(s) associated with the indicated EDT configurations (e.g., respective condition(s) associated with a respective EDT configuration). The mode may indicate one or more of the following: whether an early data complete message is expected, when the early data complete message is expected (e.g., after how many EDT transmissions), how to receive an early data complete message, or how to determine successful completion of EDT (e.g., the EDT procedure).

Features described herein may be associated with EDT transmission and/or determining completion of an EDT procedure. For example, one or more of the following may be performed by a WTRU. A WTRU may receive configuration information associated with EDT completion (e.g. the received configuration information may be indicated via system information). The WTRU may determine to trigger an uplink transmission using EDT (e.g., may determine that an uplink transmission using EDT is triggered), e.g., based on a data request from an application (e.g., an indication that data is available, for example available for EDT). The WTRU may determine, select, and/or use an EDT completion response mode, for example based on one or more of the following: an indication that data is available (e.g., EDT data), indicated EDT configuration(s), or indicated condition (s) associated with the indicated EDT configurations (e.g., respective condition(s) associated with a respective EDT configuration). The WTRU may transmit an RRC early data request message to the network (e.g., the WTRU may send an uplink EDT transmission to a network entity, such as base station, where the uplink EDT transmission includes uplink data, for example the uplink data indicated by the data request). The WTRU may determine that the EDT procedure is or is not completed (e.g., the WTRU may send additional uplink EDT transmission(s) if the EDT procedure is not determined as completed). The WTRU may continue in or return to an idle condition (e.g., RRC IDLE) and monitor for paging (e.g., monitor for a paging message).

The received configuration information associated with EDT completion may include: an indication of one or more EDT completion response mode configurations; and/or a set of one or more conditions associated with the one or more EDT completion response mode configurations (e.g., respective condition(s) associated with a respective EDT configuration). An EDT completion response mode configuration may indicate whether a completion response is to be received: via RRC, via L1 ACK, via MAC CE, via a common ACK message (e.g. group acknowledgement for multiple WTRUs), or no response is expected, and in some examples an associated time window e.g. for monitoring for a retransmission indication. A set of one or more conditions associated with a respective EDT completion response mode configuration may include a respective one or more of: RSRP threshold, TA validity condition (e.g. timer since TA was acquired not expired, threshold distance since acquired, etc.); a number of times (e.g. subsequent EDT procedures) the optimized (e.g. unacknowledged) procedure may be used before using a complete (e.g. acknowledged) procedure; a pattern of transmission procedure types (e.g., perform 1 UM, 1 AM, then 2 UM, 1 AM); or a size of data or TBS satisfying a threshold.

The WTRU determining that an uplink transmission using EDT is triggered may be based on a data request from an application. The WTRU may receive an indication from the application that a downlink application layer response message is not expected for this EDT transmission. In some examples, the received indication may be included in the data request from an application.

The WTRU may, as described herein, transmit an RRC early data request message to the network (e.g., the WTRU may send an uplink EDT transmission to a network entity, such as base station, where the uplink EDT transmission includes uplink data, for example the uplink data indicated by the data request). The WTRU may indicate (e.g., in the uplink EDT transmission) an indication that no application layer response is expected or an indication of the selected EDT completion mode response configuration (e.g. using an index, for example, in case more than one is possible). In some examples, if an application layer response is expected, a default may be "acknowledged" operation (e.g., WTRU may expect RRCEarlyDataComplete).

The WTRU may determine that the EDT procedure is completed based on the configured selected EDT completion mode response configuration and the condition for determining the procedure completion having been detected. The condition being detected may comprise detecting one or more of the following: reception of an L1 ACK, reception of a MAC CE, reception of an RRC complete message, detection of a common ACK (e.g., the WTRU may monitor for and/or receive a PDSCH message using a common RNTI), or determine a lack of NACK reception during a time duration (e.g., the WTRU may monitor a PDCCH and determine that no NACK has been received during a tie duration).

In some examples, a WTRU may perform EDT and waits for RRCEarlyDataComplete in case the application layer indicates a response is expected or may be expected or a condition is met to use the acknowledged procedure (e.g. RSRP too low, threshold number of UM attempts used, etc.).

Although features and elements described above are described in particular combinations, each feature or element may be used alone without the other features and elements of the preferred embodiments, or in various combinations with or without other features and elements.

Although the implementations described herein may consider 3GPP specific protocols, it is understood that the implementations described herein are not restricted to this scenario and may be applicable to other wireless systems. For example, although the solutions described herein consider LTE, LTE-A, New Radio (NR) or 5G specific protocols, it is understood that the solutions described herein are not restricted to this scenario and are applicable to other wireless systems as well.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as compact disc (CD)-ROM disks, and/or digital versatile disks (DVDs). A processor in association with software may be used to implement a radio frequency transceiver for use in a WTRU, terminal, base station, RNC, and/or any host computer.

We claim:

1. A wireless transmit/receive unit (WTRU), comprising:
a processor, wherein the processor is configured to:
receive an indication that indicates early data transfer (EDT) configuration information;
determine that a first uplink EDT transmission is triggered for first uplink data, wherein the determination that the first uplink EDT transmission is triggered for the first uplink data is based on application information, and wherein the application information indicates that an early data complete response is not required for the first uplink EDT transmission;
determine, based on the determination that the first uplink EDT transmission is triggered, an EDT completion response mode to apply based on the received indication;
send the first uplink EDT transmission to a network entity, wherein the first uplink EDT transmission includes the first uplink data, and wherein the first uplink EDT transmission indicates:
that no response is expected for the first uplink EDT transmission, and
the determined EDT completion response mode;
determine that a completion indication from the network entity has not been detected during a first time duration; and
based on the determination that the completion indication from the network entity has not been detected during the first time duration, continue operation in accordance with an idle condition and monitor for a paging message.

2. The WTRU of claim 1, wherein the processor is configured to:
determine that a second uplink EDT transmission is triggered for second uplink data;
send the second uplink EDT transmission to the network entity, wherein the second uplink EDT transmission includes the second uplink data;
based on the determined EDT completion response mode, monitor for the completion indication, wherein the completion indication is indicated via one of: reception of a common ACK or a lack of NACK reception during a second time duration; and
detect the completion indication.

3. The WTRU of claim 1, wherein the EDT configuration information indicates:
a first EDT configuration that indicates at least one of: a first completion response mode or a first set of one or more conditions, and
a second EDT configuration that indicates at least one of: a second completion response mode or a second set of one or more conditions.

4. The WTRU of claim 3, wherein the determined EDT completion response mode is one of the first completion response mode or the second completion response mode, and wherein the determined EDT completion response mode is determined based on a corresponding set of one or more conditions being satisfied, and wherein the corresponding set of one or more conditions is one of the first set of one or more conditions or the second set of one or more conditions.

5. The WTRU of claim 4, wherein the corresponding set of one or more conditions comprises one or more of:

a data size satisfying a threshold, a timing advance (TA) threshold being satisfied, or a reference signal received power (RSRP) threshold being satisfied.

6. The WTRU of claim 1, wherein the indication that indicates the EDT configuration information is received via system information.

7. The WTRU of claim 1, wherein the application information is application layer information.

8. A method implemented in a wireless transmit/receive unit (WTRU), comprising:

receiving an indication that indicates early data transfer (EDT) configuration information;

determining that a first uplink EDT transmission is triggered for first uplink data, wherein the determination that the first uplink EDT transmission is triggered for the first uplink data is based on application information, and wherein the application information indicates that an early data complete response is not required for the first uplink EDT transmission;

determining, based on the determination that the first uplink EDT transmission is triggered, an EDT completion response mode to apply based on the received indication;

sending the first uplink EDT transmission to a network entity, wherein the first uplink EDT transmission includes the first uplink data, and wherein the first uplink EDT transmission indicates:

that no response is expected for the first uplink EDT transmission, and the determined EDT completion response mode;

determining that a completion indication from the network entity has not been detected during a first time duration; and based on the determination that the completion indication from the network entity has not been detected during the first time duration, continuing operation in accordance with an idle condition and monitor for a paging message.

9. The method of claim 8, wherein the method further comprises:

determining that a second uplink EDT transmission is triggered for second uplink data;

sending the second uplink EDT transmission to the network entity, wherein the second uplink EDT transmission includes the second uplink data;

based on the determined EDT completion response mode, monitoring for the completion indication, wherein the completion indication is indicated via one of: reception of a common ACK or a lack of NACK reception during a second time duration; and detecting the completion indication.

10. The method of claim 8, wherein the EDT configuration information indicates:

a first EDT configuration that indicates at least one of: a first completion response mode or a first set of one or more conditions, and a second EDT configuration that indicates at least one of: a second completion response mode or a second set of one or more conditions.

11. The method of claim 10, wherein the determined EDT completion response mode is one of the first completion response mode or the second completion response mode, and wherein the determined EDT completion response mode is determined based on a corresponding set of one or more conditions being satisfied, and wherein the corresponding set of one or more conditions is one of the first set of one or more conditions or the second set of one or more conditions.

12. The method of claim 11, wherein the corresponding set of one or more conditions comprises one or more of:

a data size satisfying a threshold, a timing advance (TA) threshold being satisfied, or a reference signal received power (RSRP) threshold being satisfied.

13. The method of claim 8, wherein the indication that indicates the EDT configuration information is received via system information.

14. The method of claim 8, wherein the application information is application layer information.

* * * * *